United States Patent [19]

Fabel et al.

[11] 4,128,694
[45] Dec. 5, 1978

[54] LAMINATES COMPRISING A PLASTICIZED INTERLAYER

[75] Inventors: David A. Fabel, Springfield; James A. Snelgrove, Monson; Robert H. Fariss, Northampton, all of Mass.

[73] Assignee: Monsanto Company, St. Louis, Mo.

[21] Appl. No.: 794,776

[22] Filed: May 9, 1977

[51] Int. Cl.$^2$ .............................................. B32B 27/36
[52] U.S. Cl. ..................................... 428/412; 428/437
[58] Field of Search ................................ 428/412, 437

[56] References Cited

U.S. PATENT DOCUMENTS

| 3,388,034 | 6/1968 | McCombie | 428/437 |
| 3,406,086 | 10/1968 | Foster | 428/437 |
| 3,671,370 | 6/1972 | Littel | 428/412 |

FOREIGN PATENT DOCUMENTS 1093864 12/1967 United Kingdom.

Primary Examiner—Marion E. McCamish
Assistant Examiner—E. Rollins Buffalow
Attorney, Agent, or Firm—David Bennett; W. J. Farrington; J. C. Logomasini

[57] ABSTRACT

A laminate comprising a sheet of the polycarbonate or polyacrylate resin in face-to-face contact with a sheet of polyvinyl butyral plasticized with an effective amount of a plasticizer which is at least a partial ester formed by reaction of an alcohol having from 2 to 4 hydroxyl groups and a $C_{16}$-$C_{20}$ unsaturated fatty acid having a hydroxyl group attached to the acid molecule.

8 Claims, No Drawings

LAMINATES COMPRISING A PLASTICIZED INTERLAYER

BACKGROUND OF THE INVENTION

The present invention is concerned with plasticized interlayers for laminated glazing units particularly laminates in which one of the layers in contact with the plasticized interlayer is formed from a resin subject to crazing when contacted with organic solvents.

The conventional safety glass used in automobile windshields, security glass and in a variety of architectural applications comprises two sheets of glass with an interlayer of a tough transparent plastic such as a plasticized polyvinyl acetal.

These structures have proved extremely successful for many years but they are not without their drawbacks. Because they comprise two sheets of glass they carry a weight penalty that it is often desirable to avoid, particularly in automobiles where weight savings can be quickly converted into improved gas economy. In addition, where the laminates are used to produce automobile windshields it has been found that in a crash, should any of the passengers be thrown head forward into the windshield with sufficient force, the inboard glass layer of the laminate will shatter. Any subsequent sliding motion against the fragments of shattered glass, which are held in place by the interlayer, leads to severe lacerations of the head even though the head does not penetrate the windshield.

Considerations like the above have led to the proposal that at least one of the glass layers of laminates be replaced by a transparent rigid thermoplastic resin that would be much lighter than glass, would not be so easily shattered and, if broken, would not produce dangerous fragments with sharp cutting edges.

Another very significant use of such units is in the field of security glazing where a layer of a suitable thermoplastic resin can impart substantial toughness when laminated into a glazing unit making it very suitable for security purposes as for example in banks and in prisons without bars.

Among such transparent rigid, thermoplastic resins are the polycarbonates and the polyacrylates such as polymethyl methacrylate. These have excellent clarity, rigidity and hardness and are easily produced in sheet form. Unfortunately, they are somewhat susceptible to crazing and accelerated stress cracking in the presence of many organic compounds — including compounds commonly used as plasticizers for the polyvinyl acetal interlayer.

The phenomenon of "crazing" referred to above is the development of a network of minute surface cracks in the polycarbonate or polyacrylate sheet that cover the surface and produce a whitening effect that destroys the clarity of the sheet.

It has therefore, been necessary to develop a plasticizer for polyvinyl acetal resins that is adapted for use in interlayers in contact with polycarbonate and polyacrylate sheet. An effective plasticizer for use in a polyvinyl acetal interlayer in contact with such resins must therefore:

(1) plasticize the polyvinyl acetal interlayer effectively;
(2) not "craze" the sheet in contact with the interlayer;
(3) be stable at the temperature at which the interlayer is extruded;
(4) be stable to ultraviolet light;
(5) be stable to action of water;
(6) have low color through the temperature range likely to be encountered;
(7) not impair adhesion of the interlayer to the resin sheet; and
(8) be able to tolerate a small amount of water without giving rise to phase separation in the interlayer (blushing).

PRIOR ART

Laminates comprising polycarbonate sheets in contact with plasticized polyvinyl acetal sheets are described in U.S. Pat. Nos. 3,406,086 and 3,539,442. The plasticizers used for the polyvinyl butyral layers were phosphates and sulfonamides respectively and these worked very well and gave rise to no problems providing the polyvinyl acetal resin was cast to form the sheet. However, it is more efficient to produce large volumes of sheet by an extrusion process and it is found that under the high temperature conditions used to extrude polyvinyl acetal the plasticizers used began to decompose.

The present invention provides a plasticizer for polyvinyl acetal interlayers which meets the above criteria including high temperature stability and supplies an effective laminated glazing unit comprising a polycarbonate or a polyacrylate sheet.

SUMMARY OF THE INVENTION

The present invention provides a laminate comprising a sheet of a polycarbonate or polyacrylate resin in face-to-face contact with a sheet of polyvinyl butyral plasticized with an effective amount of a plasticizer which is at least a partial ester formed by reaction of an alcohol having from 2 to 4 hydroxyl groups and a $C_{16}$-$C_{20}$ unsaturated fatty acid having a hydroxyl group attached to the acid molecule.

The most common unsaturated fatty acid ester falling within the above category of plasticizers is glycerol triricinoleate which is the main component of castor oil. The use of castor oil as a plasticizer for polyvinyl acetals such as polyvinyl butyral was described in U.S. Pat. No. 2,423,565 but it has not been recognized as also having the particular blend of properties that characterize a plasticizer that can be used to produce an extruded polyvinyl acetal sheet that, when laminated to a polycarbonate or a polyacrylate resin sheet, will not produce crazing.

While the glycerol esters are found to be very satisfactory, other esters based on for example tri-ethylene glycol, trimethylol propane and pentaerythritol can also be used.

The acids that may be used to form the esters have from 16 to 20 carbon atoms and include beside ricinoleic acid (12-hydroxy-oleic acid) other hydroxy-oleic acids with the hydroxyl group located on other than "12" carbon atoms such as 6-, 8-, 14-, or 16- hydroxy oleic acid, 12-hydroxyelaidic acid and acids with the same empirical formula with the hydroxyl located on other than the "12" atom. Also included are the corresponding variations of 12-hydroxy-hexadec-9-enoic acid and 12-hydroxy-eicos-9-enoic acid.

A single acid may provide all the esterifying acid groups but usually a mixture of esterifying acids, some of which need not be unsaturated, are used, as for an example in naturally occurring castor oil provided that the esterifying acids together provide at least one unsaturation and one hydroxyl group per molecule of plasticizer.

The preferred plasticizer is castor oil which comprises a mixture of esters formed by the reaction of glycerol with the following acids, (the figure in parentheses being the approximate weight percent of esters formed from that acid): ricinoleic acid (86%), oleic acid (8.5%), linoleic acid (3.5%), stearic acid 1% and dihydroxystearic acid. Approximately 63.6% of the ricinoleate was the triester, 31.1% the diester and 5.1% the monester.

In a variation of the present invention the unsaturated acid component may be wholly or partially replaced by an acetylated hydroxy-acid. In a further variation the ester can be oxidatively polymerized or epoxidized to produce derivatives that also have utility as plasticizers in the present invention.

The amount of such plasticizer to be used in the laminate interlayer of the invention can be from 10 to 55 parts per hundred based on the resin (phr). It is however, preferred that the amount is from 20 to 50 phr and particularly from 30 to 40 phr.

In general, the polyvinyl acetal resins employed may be considered to be made up, in a weight basis, of from 5 to 25 percent hydroxyl groups, calculated as polyvinyl alcohol, 0 to 4 percent acetate groups, calculated as polyvinyl acetate, and the balance substantially acetal. When the acetal is butyraldehyde acetal, the polyvinyl acetal resin will preferably contain, on a weight basis, from 10 to 25 percent hydroxyl groups, calculated as polyvinyl alcohol and from 0 to 10 percent acetate groups, calculated as polyvinyl acetate, the balance being substantially butyraldehyde acetal. These figures are not however any limitation on the invention since polyvinyl butyrals outside these generally available ranges may be used if desired.

The polycarbonate may be any suitable sheet of polycarbonate such as that disclosed in U.S. Pat. Nos. 3,028,365 and 3,117,019 and is preferably prepared by reacting di(monohydroxyaryl)-alkanes with derivatives of carbonic acid such as phosgene and bischloro-carbonic acid esters of di(monohydroxyaryl)-alkanes.

The polycarbonates can also be produced by introducing phosgene into solutions of di-(monohydroxyaryl)-alkanes in organic bases, such as dimethylaniline, diethylaniline, trimethylamine and pyridine, or into solutions of di-(monohydroxyaryl)-alkanes in inert organic solvents, such as benzene, ligroine, cyclohexane, methylcyclohexane, benzene, toluene, xylene, chloroform, methylene chloride, carbon tetrachloride, trichloroethylene, dichloroethane, methylacetate and ethylacetate, with the addition of an acid-binding agent as mentioned above.

A process particularly suitable for producing polycarbonates consists in introducing phosgene into the aqueous solution or suspension of alkali metal salts such as lithium-, sodium-, potassium-, and calcium-salts of di-(monohydroxyaryl)-alkanes, preferably in the presence of an excess of a base such as lithium-, sodium-, potassium- and calcium-hydroxide or -carbonate. The polycarbonate precipitates out from the aqueous solution.

The conversion in the aqueous solution is promoted by the addition of indifferent solvents of the kind mentioned above which are capable of dissolving phosgene and eventually the produced polycarbonate.

The phosgene may be used in an equivalent amount, generally, however, it is preferable to use an excess of the phosgene.

Finally, it is also possible to react the di-(monohydroxyaryl)-alkanes with about equimolecular amounts of bis-chlorocarbonic acid esters of di-(monohydroxyaryl)-alkanes under corresponding conditions.

In the production of polycarbonates according to the various processes, it is advantageous to employ small amounts of reducing agents, for example sodium- or potassium-sulphide, -sulphite and -dithionite or free phenol and p-tert.-butylphenol.

By adding monofunctional compounds which are capable of reacting with phosgene or with the end groups of the polycarbonates consisting of the chlorocarbonic acid ester group and which terminate the chains, such as the phenols for instance the phenol, the tert.-butylphenol, the cyclohexylphenol, and 2,2-(4-hydroxyphenol-4'-methoxyphenyl)-propane, further aniline and methylaniline, it is possible to regulate the molecular weight of the polycarbonates in wide limits.

Where the resin sheet is a polyacrylate this may be as ester of a lower aliphatic alcohol, such as butyl-, propyl-, ethyl-, or methyl alcohol and acrylic-, methacrylic-, ethacrylic, propacrylic- or butacrylic- acid. By far the most convenient is polymethyl methacrylate.

The plasticized interlayer of the invention can be used to make a simple laminate with the interlayer in contact on at least one surface with a polycarbonate or a polyacrylate sheet. Often one of the surfaces of the interlayer will be in contact with a different material such as glass.

For security glass it is usual to provide a multiplicity of layers, such as four or more, with plasticized interlayers and polycarbonate or polyacrylate layers and glass layers laminated together to form laminates of from ½ inch up to several inches in thickness. For such purposes the construction usually comprises glass/interlayer/ polycarbonate or polyacrylate/interlayer/ glass units multiplied as appropriate.

For many purposes where the function of the polycarbonate or polyacrylate sheet is to provide a light weight substrate for one of the glass sheets in a glass/interlayer/glass laminate, it will be advantageous to supply an abrasion resistant coating to the exposed surface of the polycarbonate or polyacrylate sheet. Such coatings frequently comprise a polyurethane or the reaction product of polysilicic acid with a hydroxyl containing polymer such as polyvinyl alcohol or a partially hydrolyzed polyvinyl acetate or polyvinyl acetal. The provision of such coatings is considered to be within the purview of the present invention.

The laminates produced using the plasticized interlayer of the invention may be treated to reduce light transmission by tinting one or more of the component layers or by supplying a metallized surface to one or more of the layers. The treatment can be such as to produce a uniform reduction in light transmission over the whole sheet or perhaps in the form of a band or other form of localized effect.

The invention is further described with reference to the following examples which are for the purposes of illustration only and are not intended to imply any limitation or restriction to the invention.

SPECIFIC EMBODIMENTS

Examples 1 and 2 set forth the production and performance of laminates of the invention. Examples 3 and 4 describe the comparative performances of castor oil and a number of commercial plasticizers in an accelerated testing rig used to screen potential plasticizers.

EXAMPLE 1

An interlayer composition comprising a polyvinylbutyral having 18% hydroxyl groups (measured as polyvinyl alcohol) and 50 parts per hundred of castor oil was extruded to form an interlayer sheet. No discoloration was observed.

This sheet was used to form a laminate having the structure, glass/interlayer/polycarbonate/interlayer/glass, at 150° C. and 0.21 to 0.35 kg/cm². The interlayer thicknesses were 0.762 and 1.524 mm and the polycarbonate sheet had a thickness of 3.2 mm. The polycarbonate used was an optical grade product available from General Electric under the tradename LEXAN SL-3000-111N.

The laminate showed no deterioration in clarity after 200 days.

By contrast, an identical laminate produced as above except that a standard commercial polyvinyl butyral containing dihexyl adipate as plasticizer suffered a very marked loss of clarity after only a few hours due to crazing of the polycarbonate.

EXAMPLE 2

A glass/combined interlayer/polycarbonate laminate was produced by laminating two intermediate laminae having the following construction:
1. interlayer/glass; and
2. interlayer/polycarbonate.

The contacting surfaces were interlayer surfaces. The polycarbonate layer had a thickness of 3.2 mm and was formed from an optical grade polycarbonate available from General Electric under the tradename LEXAN SL3000-111N. The two halves of the combined interlayer were identical and comprised a polyvinyl butyral with a hydroxyl content of 15% (measured as polyvinyl alcohol), and 37 phr of castor oil as plasticizer. The combined thickness of the two halves in the final laminate was 0.74 mm.

The first laminate was produced at a temperature of 150° C. and 0.35 kg/cm². The second was produced at 135° C. and 0.35 kg/cm². The two were laminated at 93° C. and 0.487 kg/cm².

The laminate showed no deterioration in clarity after several months.

EXAMPLE 3

This Example describes the results of tests designed to screen possible plasticizers for use in polyvinyl butyral when laminated to a polycarbonate.

The test used is the one described in MIL-P-8184B and is designed to determine the tendency of a polymer to craze under the influence of a plasticizer.

In the test, a polycarbonate sample 7.6 mm × 25.4 mm × 178 mm was placed in a horizontal rig in which it was supported on a fulcrum 60 mm from a first end and maintained in a horizontal position by a fixed stop located 9.5 mm from the first end. A load was then placed on the second end (i.e., opposite the supported end) at a distance of 103 mm from the fulcrum so as to bend the sample downwards. After ten minutes a patch saturated with the plasticizer under test was placed on the beam at the point of maximum stress, i.e., opposite the fulcrum on the upper surface of the beam. After thirty minutes at room temperature the patch was removed and the sample was examined for signs of crazing.

The results are set forth in Table I.

TABLE I

| PLASTICIZER | OUTER FIBER* STRESS LEVEL kg/cm² | PERFORMANCE |
| --- | --- | --- |
| Castor Oil | 492 | No crazing |
| dihexyl adipate | 105 | Crazing |
| Dibutyl Sebacate | 105 | Incipient crazing |

*Calculated using the formula: Outer Fiber Stress = $\frac{6Pl}{Wt^2}$ where P is the applied load, L is the distance from the point of load application to the fulcrum, W is the sample width and t is the sample thickness.

Dibutyl sebacate and dihexyl adipate are known plasticizers for polyvinyl butyral. This test shows the superiority of castor oil over such plasticizers even at much higher stress levels.

EXAMPLE 4

This Example demonstrates the greater ability of the castor oil plasticizers by comparison with conventional plasticizers.

The test rig and procedures were the same as those used in Example 3 except that a square of plasticized polyvinyl butyral was used in place of a patch, the polyvinyl butyral square contained a plasticizer and had hydroxyl content of 18% OH (measured as polyvinyl alcohol) and was laminated to the polycarbonate sample under 0.35 kg/cm² pressure at 300° C. before the load was applied.

The load was set to give an outer fiber stress level of 492 kg/cm² and the sample was examined for crazing after half an hour at room temperature. The results obtained were as follows:

| PLASTICIZER | AMOUNT | PERFORMANCE |
| --- | --- | --- |
| Castor Oil | 50 phr. | No crazing |
| triethylene glycol di 2-ethyl butyrate | 42 phr. | Crazed |
| Dihexyl adipate | 38 phr. | Crazed |

The ability of a laminate of a polycarbonate and a polyvinyl butyral plasticized with castor oil to withstand this very rigorous test without crazing is a strong indication that, even on prolonged contact, castor oil from the interlayer will not induce crazing in the polycarbonate.

The interlayer may contain, in addition to the plasticizer, other additives such as dyes, ultraviolet stabilizers, salts to control adhesion, and antioxidants and it may, if desired, be treated with additives to improve its laminating efficiency. All such variations and the like are embraced within the purview of the present invention.

What is claimed is:

1. A laminate comprising at least one sheet of thermoplastic resin selected from the group consisting of polycarbonates and polyacrylates laminated to a sheet of polyvinyl butyral plasticized with an effective amount of a plasticizer which is at least a partial ester formed by the reaction of an alcohol having from 2 to 4 hydroxyl groups and a $C_{16}$ to $C_{20}$ unsaturated fatty acid having a hydroxyl group attached to the acid molecule.

2. The laminate of claim 1 in which the thermoplastic resin is a polycarbonate.

3. The laminate of claim 1 in which the plasticizer is formed by at least partially esterifying glycerol with ricinoleic acid.

4. The laminate of claim 1 in which the plasticizer is present in an amount which is 10 to 55 parts per hundred based on the weight of the polyvinyl butyral.

5. A laminate comprising a sheet of a polycarbonate resin laminated to a sheet of a polyvinyl butyral resin plasticized with from 20 to 50 parts per hundred, based on the polyvinyl butyral resin weight, of castor oil.

6. A security glazing unit comprising, in laminated sequence, sheets of glass, polyvinyl butyral, polycarbonate, polyvinylbutyral and glass wherein the polyvinyl butyral layers are plasticized with an effective amount of castor oil.

7. A glazing unit comprising, in laminated sequence, sheets of glass, polyvinyl butyral plasticized with an effective amount of castor oil, and a polycarbonate resin wherein the exposed surface of the polycarbonate resin sheet is provided with an abrasion-resistant coating.

8. A glazing unit comprising a polyvinyl butyral sheet plasticized with an effective amount of castor oil and laminated between two sheets of a polycarbonate resin.

* * * * *